US 6,674,809 B1

(12) United States Patent
Kay

(10) Patent No.: US 6,674,809 B1
(45) Date of Patent: Jan. 6, 2004

(54) NOISE REDUCING APPARATUS FOR MINIMIZING NOISE IN MODEMS

(75) Inventor: Shin-woong Kay, Seongnam (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/577,362

(22) Filed: May 23, 2000

(30) Foreign Application Priority Data

May 27, 1999 (KR) .......................... 1999-19223

(51) Int. Cl.[7] .............................................. H04B 15/02
(52) U.S. Cl. ...................................................... 375/285
(58) Field of Search ................................. 375/219, 220, 375/222, 285, 296; 455/63.1, 63.3; 725/111, 124

(56) References Cited

U.S. PATENT DOCUMENTS 6,181,365 B1 * 1/2001 Nakagawara ............... 725/124
6,356,585 B1 * 3/2002 Ko et al. .................... 375/222
6,363,241 B1 * 3/2002 Barakat et al. ............. 455/63.1

FOREIGN PATENT DOCUMENTS

JP          62-203428 A        9/1987
JP           2-272855 A       11/1990
JP          11-127211 A        5/1999

* cited by examiner

Primary Examiner—Young T. Tse
(74) Attorney, Agent, or Firm—Sughrue Mion, PLLC

(57) ABSTRACT

A noise reducing apparatus for minimizing spurious noise in a system utilizing a cable modem is provided. The noise reducing apparatus for reducing a noise generated according to operation of a modem includes a controlling unit for controlling the modem and producing an enable signal according to generation of the noise, a programmable gain controller for turning on/off a transmission level in response to the enable signal of the controlling unit, a noise removing unit for removing predetermined noise generated by the programmable gain controller when the modem does not transmit a signal, and a tuner for tuning the output of the noise removing unit to connect it to a coaxial cable network. Since a circuit comprised of gates and gallium arsenide integrated circuit single-pole double-throw switches is employed therein to minimize spurious noise when a cable modem does not transmit a signal, the quality in the communication between a cable modem and a headend can be ensured.

2 Claims, 2 Drawing Sheets

NOISE REDUCING APPARATUS FOR MINIMIZING NOISE IN MODEMS

BACKGROUND OF THE INVENTION

1. Field of the Invention

The present invention relates to a communications device, and more particularly, to a noise reducing apparatus for minimizing spurious noise in a system utilizing a cable modem. The present application is based upon Korean Application No. 99-19223, which is incorporated herein by reference.

2. Description of the Related Art

One of the most important problems in conventional cable modems is the interference between cable modems caused by spurious noise. Spurious noise results in a large amount of ingress noise in the upstream transmission of a cable TV network, thereby adversely affecting communication between the terminal of a cable modem and a headend.

FIG. 1 is a block diagram showing the configuration of a conventional noise reducing apparatus. In a conventional noise reducing apparatus, a central processing unit (CPU) 11 controls the level of upstream transmission through a programmable gain controller 12. The on-off state of the programmable gain controller 12 is controlled by an enable signal of the CPU 11. A transformer 13 transforms the controlled transmission level which is then filtered by a low pass filter (LPF) 14 and tuned by a tuner 15 to be coupled to a coaxial cable network. The conventional cable modem has a disadvantage in that it cannot turn off the enable signal completely nor exclude all the radio frequency even if it can turn off the enable signal completely, when the cable modem does not transmit a signal. This results in the generation of spurious noise, which restricts smooth communication.

SUMMARY OF THE INVENTION

To solve the above problem, it is an objective of the present invention to provide a noise reducing apparatus for minimizing spurious noise when a cable modem does not transmit a signal, in which a circuit formed of gallium arsenide (GaAs) integrated circuit (IC) single pole double throw (SPDT) switches is used.

Accordingly, to achieve the above objective, it is preferable that a noise reducing apparatus for reducing noise generated in the operation of a modem includes a controlling unit for controlling the modem and producing an enable signal according to the presence of the noise, a gain controller for controlling the on-off state of a transmission level in response to the enable signal of the controlling unit, a noise removing unit for removing predetermined noise generated by the transmission level of the gain controller when the cable modem does not transmit a signal, and a tuner for tuning the output of the noise removing unit to connect it to a coaxial cable network.

BRIEF DESCRIPTION OF THE DRAWINGS

The above objective and advantage of the present invention will become more apparent by describing in detail a preferred embodiment thereof with reference to the attached drawings in which.

DESCRIPTION OF THE PREFERRED EMBODIMENTS

Figure 1:
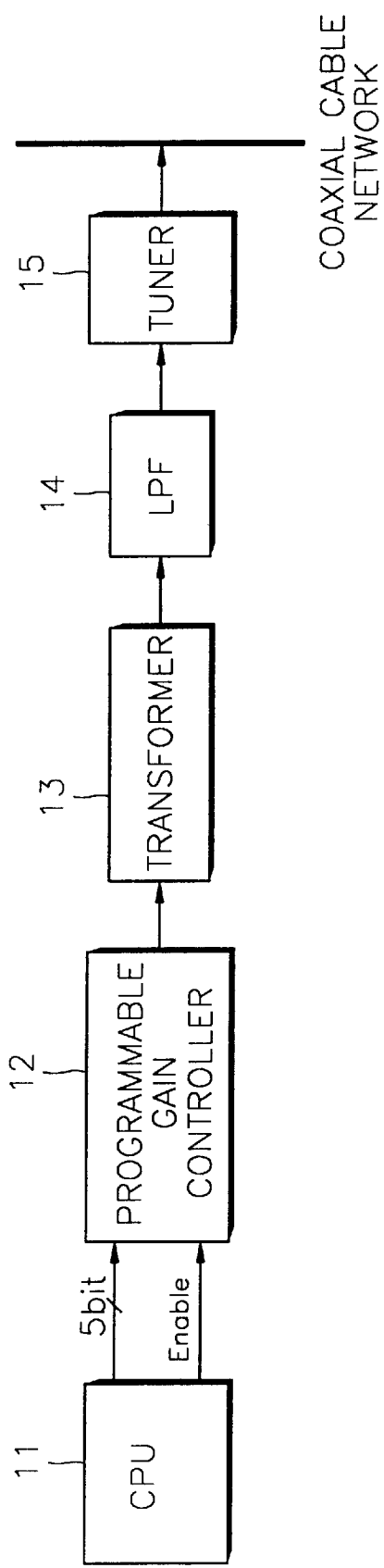
FIG. 1. is a block diagram showing the configuration of a conventional noise reducing apparatus.
Figure 2:
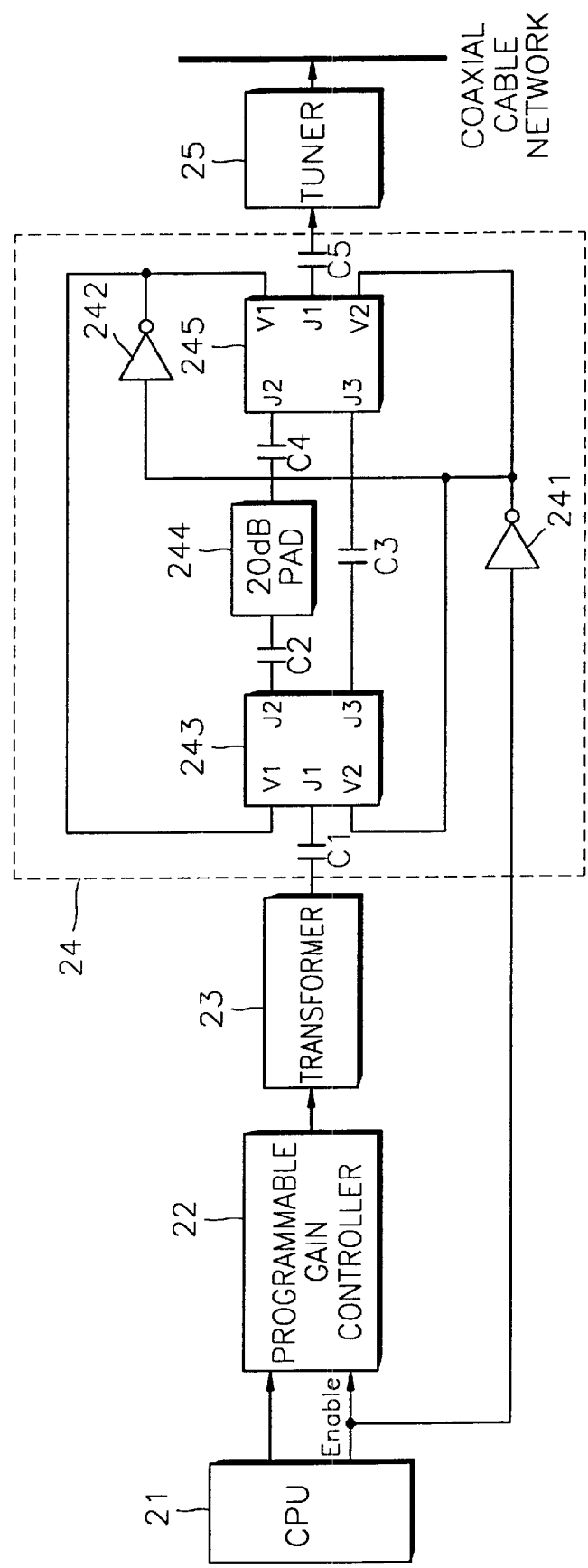
FIG. 2 is a block diagram showing the configuration of a noise reducing apparatus according to the present invention.

FIG. 2 is a block diagram showing the configuration of a noise reducing apparatus according to the present invention.

Referring to FIG. 2, the apparatus includes a central processing unit (CPU) 21 for controlling the system, a programmable gain controller 22 for turning on/off the level of upstream transmission through an enable signal of the CPU 21, a transformer 23 for converting the transmission level output from the programmable gain controller 22, a noise removing unit 24 for eliminating the noise of the transmission level output from the transformer 23, and a tuner 25 for tuning the output of the noise removing unit 24 to connect it to a coaxial cable network.

The noise removing unit 24 includes a first inverter 241 for inverting an enable signal of the CPU 21, a second inverter 242 for inverting the output of the first inverter 241, a first single pole double throw (SPDT) switch 243 for inputting the outputs of the first and the second inverters 241 and 242 to switch the output of the transformer 23, a packet assembler/disassembler (PAD) 244 for setting a first output of the first SPDT switch 243 as a 20 dB gain, a second SPDT switch 245 for inputting the outputs of the first and second inverters 241 and 242 to switch the output of the PAD 244 or a second output of the first SPDT switch 243, and a plurality of capacitors C1–C5.

Now, the present invention will be described in detail referring to FIG. 2. The CPU 21 controls the level of upstream transmission through the programmable gain controller 22, in which case an on/off operation of the programmable gain controller 22 is governed by the enable signal of the CPU 21. The controlled transmission level is transformed by the transformer 23; the output of which is input to the noise removing unit 4 to minimize spurious noise. Finally, the output of the noise removing unit 24 is tuned by the tuner 25 and connected to a coaxial cable network.

Next, operation of the noise removing unit 24 for minimizing spurious noise when a cable modem does not transmit a signal is described in detail. According to the present invention, when a cable modem is not transmitting a signal, an enable signal generated by the CPU 21 goes low such that spurious noise is reduced. Otherwise, the enable signal goes high such that a radio frequency signal can be transmitted. The operation of the first and the second GaAs IC SPDT switches 243 and 245 is shown in Table 1.

TABLE 1

| V1 | V2 | J1–J2 | J1–J3 |
|---|---|---|---|
| Low | High | Isolation | Insertion loss |
| High | Low | Insertion loss | Isolation |

When V1 is low and V2 is high, J1–J2 and J1–J3 indicate isolation and insertion loss, respectively. Conversely, when V1 is high and V2 is low, J1–J2 and J1–J3 indicate insertion loss and isolation, respectively.

Specifically, an enable signal for driving the first inverter 241 is generated by the CPU 21 and output to an enable signal of the programmable gain controller 22. In other words, if a cable modem does not transmit a signal, i.e., if the enable signal generated by the CPU 21 is low, then the internal switch (not shown) of the programmable gain controller 22 is turned off, and at the same time the enable signal drives the first inverter 241 to bring V2 of the first GaAs IC SPDT switch 243 to a high level, and drives the input signal of the second inverter 242 to bring V1 of the first GaAs IC SPDT switch 243 to a low level. Further, the output signal of the second inverter 242 drives the second GaAs IC SPDT switch 245 together to bring V2 and V1 of the second GaAs IC SPDT switch 245 to high and low levels, respectively. Accordingly, J1–J2 and J1–J3 each represent isolation and insertion loss as shown in Table 1, so that the signal output from the transformer 23 is transmitted through a tuner 25 after spurious noise is attenuated by 20dB through the PAD 244.

On the other hand, if the cable modem transmits a signal, i.e., if the enable signal for driving the first inverter 241 is high, then the enable signal generated by the programmable gain controller 22 is also high, so that the internal switch (not shown) of the programmable gain controller 22 is turned on. Simultaneously, the enable signal drives the first inverter 241 high to thereby bring V2 of the first GaAs IC SPDT switch 243 down to a low level, and drives the input signal of the second inverter 242 to bring V1 of the first GaAs IC SPDT switch 243 to a high level. Further, the output signal of the second inverter 242 drives the second GaAs IC SPDT switch 245 together to bring V2 and V1 of the second GaAs IC SPDT switch 245 to low and high levels, respectively. Thus, J1–J2 and J1–J3 each represent insertion loss and isolation as shown in Table 1 such that the signal output from the transformer 23 is transmitted directly through the tuner 25 since rare spurious noise is generated. In this case, coupling capacitors are used for the plurality of capacitors C1–C5 to pass a radio frequency signal smoothly.

As described in the foregoing, the present invention employs the circuit having gates and GaAs IC SPDT switches which significantly attenuates spurious noise when a cable modem is not transmitting a signal. Accordingly, a high quality communication between a cable modem and a headend can be achieved.

While this invention has been particularly shown and described with reference to a preferred embodiment thereof, it will be understood by those skilled in the art that various changes in form and details may be made therein without departing from the spirit and scope of the invention as defined by the appended claims.

What is claimed is:

1. A noise reducing apparatus for reducing noise according to an operation of a modem, said noise reducing apparatus comprising:

a controlling unit for controlling said modem and producing an enable signal according to generation of said noise;

a gain controller for controlling an on/off state of a transmission level in response to said enable signal generated by said controlling unit;

a noise removing unit for removing predetermined noise which is generated by said transmission level of said gain controller when said modem is not transmitting a signal; and a tuner for tuning the output of said noise removing unit to a coaxial cable network.

2. The apparatus of claim 1, wherein-said noise removing unit comprises:

a first inverter for inverting the enable signal of said controlling unit;

a second inverter for inverting output of said first inverter;

a first switch for inputting outputs of said first and said second inverters to switch output of said gain controller;

a packet assembler/dissembler for setting a first output of said first switch as a predetermined gain; and a second switch for inputting outputs of said first and said second inverters to switch output of said packet assembler/dissembleer and a second output of said first switch.

* * * * *